(12) United States Patent
Chung et al.

(10) Patent No.: US 11,830,280 B1
(45) Date of Patent: Nov. 28, 2023

(54) IMAGE PROCESSING CIRCUIT AND HOST FOR FINGERPRINT SENSING ON PANEL

(71) Applicant: NOVATEK Microelectronics Corp., Hsin-Chu (TW)

(72) Inventors: Jung-Chen Chung, Hsinchu County (TW); Chi-Ting Chen, Hsinchu (TW); Jung-Yu Tsai, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/869,773

(22) Filed: Jul. 20, 2022

(51) Int. Cl.
  *G06V 40/13* (2022.01)
  *G06F 3/041* (2006.01)
(52) U.S. Cl.
  CPC ........ *G06V 40/1318* (2022.01); *G06F 3/0418* (2013.01); *G06F 3/04166* (2019.05)
(58) Field of Classification Search
  CPC ............ G06V 40/1318; G06F 3/04166; G06F 3/0418; G06F 3/04182
  See application file for complete search history.

(56) References Cited

U.S. PATENT DOCUMENTS

| 2013/0265137 | A1* | 10/2013 | Nelson | G06V 40/1306 340/5.82 |
| 2015/0139511 | A1* | 5/2015 | Yoon | G06V 40/1306 382/124 |
| 2020/0097700 | A1* | 3/2020 | Lin | G06V 40/1306 |
| 2021/0042496 | A1* | 2/2021 | Choe | G06F 21/32 |

\* cited by examiner

*Primary Examiner* — Stephen G Sherman
(74) *Attorney, Agent, or Firm* — Winston Hsu

(57) ABSTRACT

An image processing circuit for controlling a panel is configured to: receive information of a fixed pattern noise (FPN) corresponding to a first sensing zone of the panel, wherein the first sensing zone is determined according to a touch position of a finger; scan the first sensing zone to perform fingerprint sensing on the finger, to receive a plurality of raw sensing signals; remove the FPN from the plurality of raw sensing signals to generate a plurality of modified sensing signals; and output a plurality of fingerprint data to a host for fingerprint recognition, wherein the plurality of fingerprint data are converted from the plurality of modified sensing signals.

9 Claims, 9 Drawing Sheets

IMAGE PROCESSING CIRCUIT AND HOST FOR FINGERPRINT SENSING ON PANEL

BACKGROUND OF THE INVENTION

1. Field of the Invention

The present invention relates to an image processing circuit and a host for controlling a panel, and more particularly, to an image processing circuit and a host capable of performing fingerprint sensing on a panel.

2. Description of the Prior Art

Fingerprint sensing technology is widely applied in a variety of electronic products such as a mobile phone, laptop, tablet, personal digital assistant, and portable electronics, for realizing identity recognition. The fingerprint sensing allows a user to perform identity recognition conveniently, where the user only needs to put his/her finger on a fingerprint sensor to login the electronic device instead of entering long and tedious username and password.

In recent years, optical fingerprint recognition has become one of the most popular fingerprint recognition schemes. In an optical fingerprint sensing system, a fingerprint image sensor having multiple sensing pixels may be disposed under a sensing pad or panel. During the sensing period, a light source delivers light and the sensing pixels receive the light reflected from the touch finger, to determine the peaks and valleys of the fingerprint according to the received light intensity.

However, there are various noises and offsets included in the sensed image signals. For example, the sensing pixels may have different sensing capabilities due to process mismatch and/or different degrees of aging and degradation. Since the fingerprint image sensor is usually deployed with a display panel, the structure of the display panel may also interfere with the light intensity received by each sensing pixel, to generate unwanted noises in the sensing signals generated by the sensing pixels. The noises are called fixed pattern noises (FPNs). The magnitude of an FPN is usually far greater than the ridge-to-valley difference of a fingerprint image, and thus causes difficulty in processing, amplification and analysis of the effective sensing signals. The FPN may also cause the signals received by the analog-to-digital converter (ADC) to have a larger dynamic range. Thus, there is a need for improvement over the prior art.

SUMMARY OF THE INVENTION

It is therefore an objective of the present invention to provide a fingerprint image processing circuit and a host which are capable of reducing or removing the fixed pattern noises (FPNs) in the received fingerprint sensing signals.

An embodiment of the present invention discloses an image processing circuit for controlling a panel. The image processing circuit is configured to receive information of an FPN corresponding to a first sensing zone of the panel, wherein the first sensing zone is determined according to a touch position of a finger; scan the first sensing zone to perform fingerprint sensing on the finger, to receive a plurality of raw sensing signals; remove the FPN from the plurality of raw sensing signals to generate a plurality of modified sensing signals; and output a plurality of fingerprint data to a host for fingerprint recognition, wherein the plurality of fingerprint data are converted from the plurality of modified sensing signals.

Another embodiment of the present invention discloses a host for controlling a panel. The host is configured to receive a touch position of a finger on the panel; determine a first sensing zone of the panel according to the touch position; transmit information of an FPN corresponding to the first sensing zone to an image processing circuit; and receive a plurality of fingerprint data of the finger from the image processing circuit, wherein the plurality of fingerprint data are generated according to the information of the FPN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
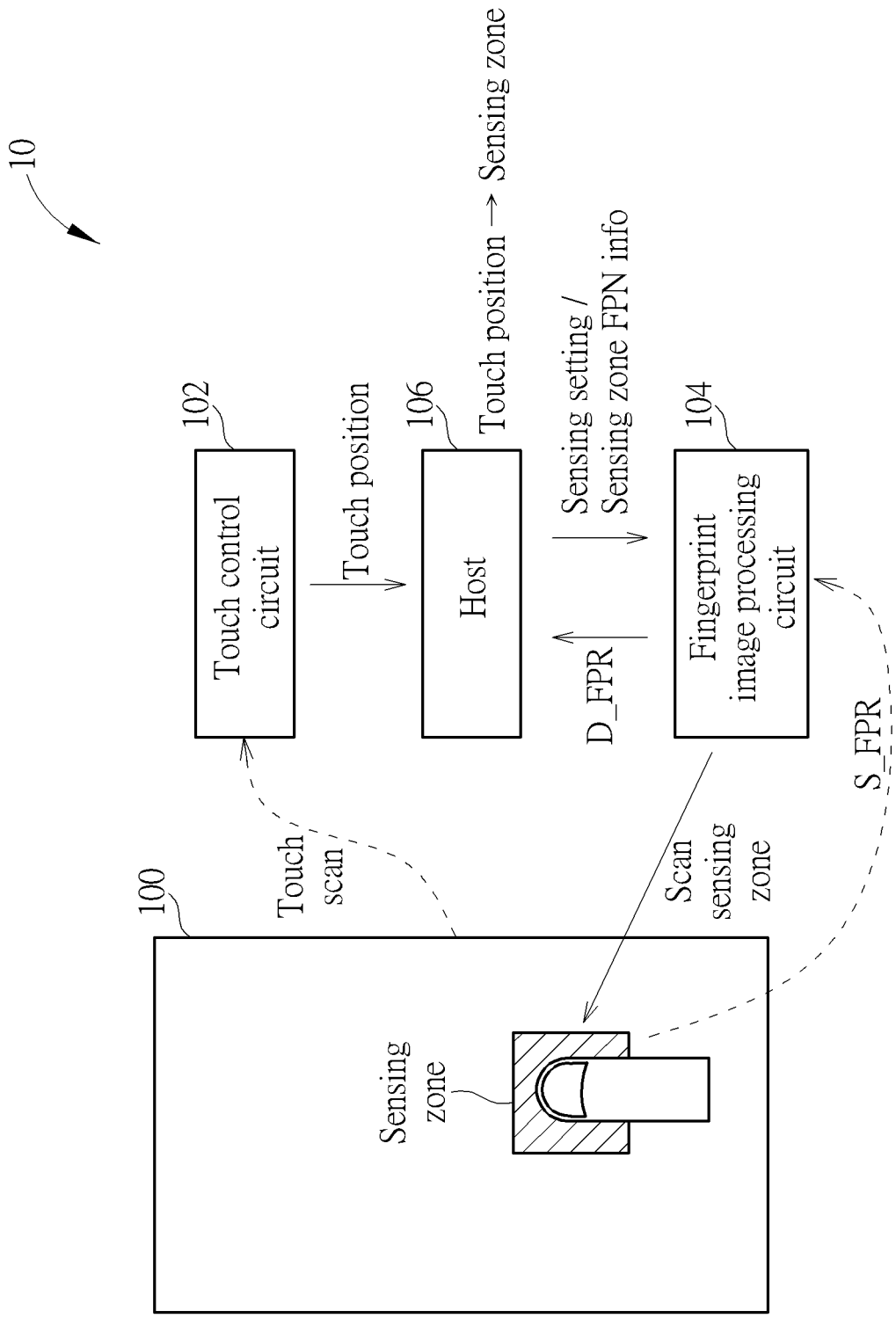
FIG. 1 is a schematic diagram of a fingerprint sensing system according to an embodiment of the present invention.

FIG. 1 is a schematic diagram of a fingerprint sensing system 10 according to an embodiment of the present invention. As shown in FIG. 1, the fingerprint sensing system 10 includes a fingerprint sensor 100, a touch control circuit 102, a fingerprint image processing circuit 104 and a host 106. The fingerprint sensor 100, which may be an optical fingerprint sensor, is configured to perform fingerprint sensing by receiving light reflected from a touch finger. In an embodiment, the fingerprint sensor 100 may be integrated with a display panel or touch panel, where the fingerprint sensing may be performed on every position of the panel, so as to realize the in-display fingerprint sensing function.

The touch control circuit 102, which may be implemented as an integrated circuit (IC) included in a chip, is configured to perform touch scan on the panel to detect whether a finger touch exists. Note that in an in-display fingerprint sensing system, the fingerprint sensing may be performed on every position of the panel; hence, the touch control circuit 102 is capable of detecting every position of the panel to determine the touch position, allowing the fingerprint sensing to be performed on the touch position. In other words, the fingerprint image processing circuit 104 may perform fingerprint sensing on the touch position which is detected by the touch control circuit 102.

Based on the touch position detected by the touch control circuit 102, the host 106 may determine a sensing zone on the panel where the finger touch is detected, and thus the fingerprint image processing circuit 104 may perform fingerprint sensing on the sensing zone. Therefore, the fingerprint image processing circuit 104 may scan the sensing pixels in the sensing zone, and control the sensing pixels to perform various operations such as reset, exposure, and sample, so as to generate fingerprint sensing signals S_FPR to be output to the fingerprint image processing circuit 104.

The fingerprint image processing circuit 104 may include an analog-to-digital converter (ADC), which is used to convert the fingerprint sensing signals S_FPR into digital fingerprint data D_FPR. The fingerprint image processing circuit 104 may perform digital signal processing on the fingerprint data D_FPR and output the fingerprint data D_FPR to the host 106. The fingerprint image processing circuit 104 may be implemented as an IC included in a chip. In an embodiment, the fingerprint image processing circuit 104 and the touch control circuit 102 may be included in the same IC, which may further be integrated with a display driver circuit to realize a fingerprint, touch and display integration (FTDI) circuit.

The host 106 is configured to perform fingerprint recognition after receiving the fingerprint data D_FPR from the fingerprint image processing circuit 104. Before the fingerprint sensing performed by the fingerprint image processing circuit 104, the host 106 may provide information of the fixed pattern noise (FPN) and related settings for the fingerprint image processing circuit 104. In this embodiment, the touch control circuit 102 may send the information of finger touch position on the panel and/or related sensing zone (s) to the host 106. The host 106 determines the sensing zone(s) and then transmits the information of FPN corresponding to the sensing zone (s) to the fingerprint image processing circuit 104; hence, the fingerprint image processing circuit 104 may process the fingerprint sensing signals S_FPR based on the FPN information received from the host 106, so as to reduce or remove the FPNs from the fingerprint sensing signals S_FPR. After the fingerprint data D_FPR are obtained, the fingerprint image processing circuit 104 may output the fingerprint data D_FPR to the host 106, and the host 106 may perform fingerprint recognition based on the received fingerprint data D_FPR.

As mentioned above, the FPNs will cause the signals received by the ADC of the fingerprint image processing circuit 104 to have a larger dynamic range; hence, it is preferable to reduce or remove the FPNs in an analog front-end (AFE) circuit before the ADC. If the FPNs are removed, the signals received by the ADC will mostly be effective fingerprint sensing signals. In an embodiment, the effective fingerprint sensing signals may be amplified to be adapted to the ADC's input range, so that the ridge-to-valley information carried in the fingerprint data may be clearer.

In this embodiment, the host 106 is requested to provide the FPN information and sensing settings for the fingerprint image processing circuit 104. In the in-display fingerprint sensing system where the fingerprint sensing is performed on a sensing zone on which the finger touch is detected, the host 106 should provide the FPN information of the sensing zone. Since the fingerprint sensor 100 has a large sensing area such as an entire panel, there may be a great number of sensing pixels, which are accompanied by a great amount of FPN data. More specifically, each sensing pixel has a respective FPN data, where the sensing signal received from a sensing pixel should be processed by removing the FPN data corresponding to this sensing pixel; hence, the entire panel having a lot of sensing pixels should have a great amount of FPN data. This great data amount cannot be stored in the limited memory space (e.g., static random access memory (SRAM)) of the fingerprint image processing circuit 104. In general, the FPN data are stored in the system memory controlled by the host 106, and it is not possible to transmit the FPN data of the entire sensing area to the fingerprint image processing circuit 104 at a time.

With the information of touch position, the host 106 will know the fingerprint sensing is performed on which sensing zone(s), and thereby transmit the FPN data corresponding to the sensing zone(s) to the fingerprint image processing circuit 104. In such a situation, only the FPN information of the sensing pixels in the sensing zone (s) is transmitted to the fingerprint image processing circuit 104, while the FPN information of other sensing pixels outside the sensing zone(s) needs not to be transmitted. As a result, the overall data quantities transmitted by the host 106 and received by the fingerprint image processing circuit 104 may be reduced, which significantly accelerates the fingerprint sensing operations and improves the user experience of fingerprint recognition.

Therefore, the sensing zone(s) for performing fingerprint sensing may be determined by the host 106 according to the finger touch position that may be received from the touch control circuit 102. In an embodiment, the sensing area on the panel or the fingerprint sensor 100 may be divided into a plurality of sensing zones. According to the finger touch position, the host 106 may select at least one of the plurality of sensing zones to provide the related FPN data, thereby controlling the fingerprint image processing circuit 104 to perform fingerprint sensing on the selected sensing zone(s). Alternatively, a sensing zone may be flexibly defined to contain any number of sensing pixels based on the finger touch position. For example, the sensing zone may include a predetermined number of sensing pixels centering on the center of the finger touch position, where the FPN data of these sensing pixels are provided for the fingerprint image processing circuit 104. In an exemplary embodiment, the sensing zone may be determined to include 100 rows and 100 columns of sensing pixels, where the center of the sensing zone may coincide with the center of the detected finger touch position.

Figure 2:
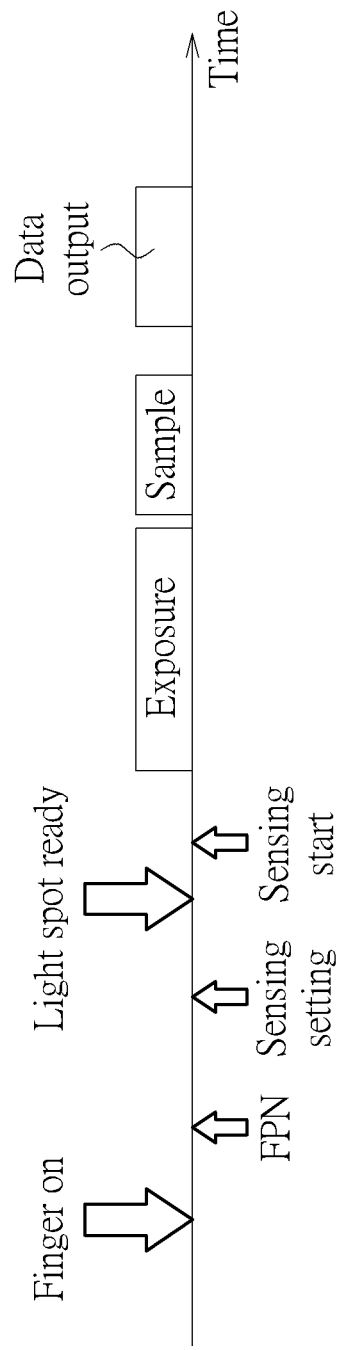
FIG. 2 is a timing diagram of fingerprint sensing performed in the fingerprint sensing system according to an embodiment of the present invention.

FIG. 2 is a timing diagram of fingerprint sensing performed in the fingerprint sensing system 10 according to an embodiment of the present invention. First of all, a finger put on the fingerprint sensor 100 is detected, e.g., by the touch control circuit 102. Based on the finger touch position, the host 106 may determine one or more sensing zones and transmit the FPN information corresponding to the sensing zone(s) to the fingerprint image processing circuit 104. The related sensing settings are also transmitted to the fingerprint image processing circuit 104. These settings may include, but not limited to, the exposure time, gain/offset settings, number of sensing cycles, and/or other sensing parameters. In an embodiment, the fingerprint image processing circuit 104 may be connected to the host 106 through a transmission interface such as the serial peripheral interface (SPI). Therefore, the FPN information and the sensing settings may be transmitted through the transmission interface.

Subsequently, the host 106 and/or the display driver circuit may generate a light spot on the panel, and the light spot may irradiate the finger on the sensing zone. After the light spot is ready, the fingerprint image processing circuit 104 may start the fingerprint sensing operations including exposure and sampling. The fingerprint sensing signals, which may be obtained in the sampling operations, are then processed by removing the FPNs and converted into fingerprint data, which is output to the host 106 through the transmission interface such as the SPI.

Before the fingerprint sensing operations, it is necessary to transmit the FPN information and sensing settings to the fingerprint image processing circuit 104, allowing the fingerprint image processing circuit 104 to remove the FPNs from the fingerprint sensing signals. The transmission of the FPN information before fingerprint sensing is called a "preload" operation, where the FPN data are preloaded to the fingerprint image processing circuit 104. The preload operation should be completed before the light spot is ready, so as to prevent the fingerprint sensing operations from being delayed. However, the FPN data are numerous, and the present invention provides several schemes to preload the FPN data, so as to reduce the time consumption required for FPN data transmission.

In the first preload scheme, the host 106 may transmit all the FPN data in the sensing zone(s) to the fingerprint image processing circuit 104, to be stored in the memory of the fingerprint image processing circuit 104. Only those FPN data in the selected sensing zone(s) are transmitted, which is far less than the FPN data of the entire panel; hence, the transmission time may still be saved.

In order to further reduce the time consumption, in the second preload scheme, only a part of the FPN data corresponding to the sensing pixels having a specific interval in the selected sensing zone(s) are contained in the transmitted FPN information. The fingerprint image processing circuit 104 may generate other parts of the FPN data in the selected sensing zone(s) by itself. A common method for generating these FPN data is interpolation. In general, nearby sensing pixels usually have similar FPN data, and thus utilizing interpolation to recover the FPN data may still generate appropriate data values to compensate for the FPNs.

Figure 3:
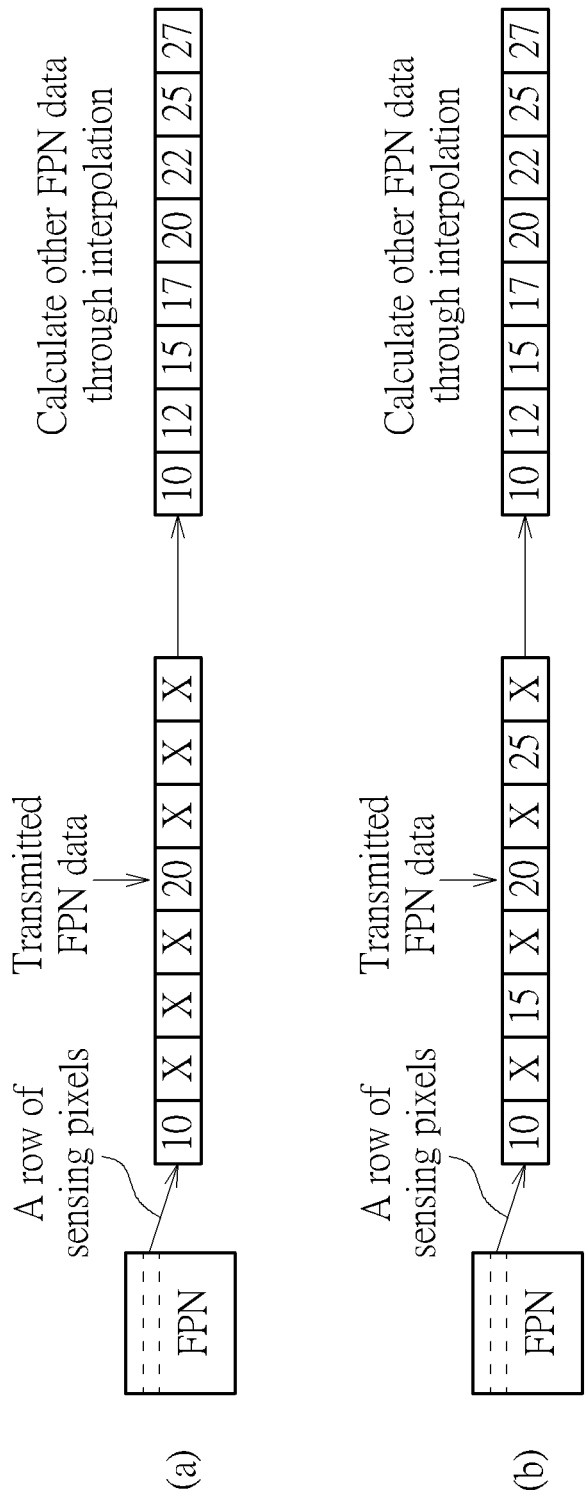
FIG. 3 illustrates several schemes of transmitting partial FPN data.

FIG. 3 illustrates several schemes of transmitting partial FPN data, where the FPN data in a row of sensing pixels in a selected sensing zone are taken as an example. As shown in FIG. 3(a), the FPN data of every 1 of 4 adjacent sensing pixels is transmitted, and other FPN data are generated through linear interpolation. In such a situation, the FPN information transmitted by the host 106 is decreased to one-fourth. As shown in FIG. 3(b), the FPN data of every 1 of 2 adjacent sensing pixels is transmitted, and other FPN data are generated through linear interpolation. In such a situation, the FPN information transmitted by the host 106 is decreased by half. Note that FIG. 3 illustrates 1-dimensional examples where the transmission scheme is applied to a row of sensing pixels. This method may be applicable to a planar sensing zone to realize 2-dimensional implementation, so as to further reduce the transmitted data amount and save the transmission time.

In the third preload scheme, the FPN data may be encoded to have a fixed term and a variable term as the FPN information to be transmitted to the fingerprint image processing circuit 104 from the host 106. The fixed term may be any appropriate data value, for example, equal to the average of a series of FPN data, where the fixed term of every FPN data has the same and fixed value. The variable term may be calculated as the FPN data minus the fixed term; that is:

$$D_{fpn}=D_{dc}+D_{ac1};$$

where $D_{fpn}$ refers to the FPN data of a specific sensing pixel, $D_{dc}$ is the fixed term, and $D_{ac1}$ is the variable term.

In an embodiment, the value of the fixed term may be regarded as a sensing setting to be transmitted to the fingerprint image processing circuit 104, and the FPN information may only contain the variable term for each sensing pixel. The deduction of the fixed term may reduce the overall data values, thereby reducing the possible data bits required to represent each FPN data; hence, the transmitted data amount may be decreased and the transmission time may be saved. In an exemplary embodiment, a variable length encoding method may be applied to encode the variable term of the FPN data, so that the usage of data bits may be reduced since the value of the variable term is usually smaller than the value of the original FPN data.

In an embodiment, the data amount may further be reduced by using lower resolution for the variable term, e.g., lower than the resolution of the original FPN data. For example, supposing that the original variable term $D_{ac1}$ is an 11-bit value ranging from 0 to 2047, and this variable term $D_{ac1}$ may be simplified to generate a new variable term $D_{ac2}$ with a 4-bit value ranging from 0 to 15. In an exemplary embodiment, the new variable term Dace may be easily obtained by taking 4 most significant bits of the original variable term $D_{ac1}$. Therefore, each FPN data transmitted by the host 106 may only include 4 bits instead of 11 bits, as a significant reduction of data amount. The fingerprint image processing circuit 104 may thereby calculate the FPN data as follows:

$$D_{fpn}=D_{dc}+128\times D_{ac2}+D_{err}\approx D_{dc}+128\times D_{ac2};$$

where $D_{err}$ is an error with the decreased resolution of the new variable term $D_{ac2}$. Although a small error is unavoidable under this preload scheme, the FPN data may still be used to reduce the FPNs in the fingerprint sensing signals.

In the fourth preload scheme, the FPN information transmitted to the fingerprint image processing circuit 104 includes differential values of the FPN data; that is, the differential values of every two adjacent FPN data are transmitted. In general, nearby sensing pixels usually have similar FPN data, and thus their differential values may usually be close to 0. In such a situation, the variable length encoding method may be applied to reduce the data amount, thereby saving the transmission time of FPN information. Based on the transmission of differential values, the fingerprint image processing circuit 104 may easily recover the original FPN data by adding the differential value to its previous FPN data.

Please note that the present invention aims at providing a novel method applicable to the fingerprint image processing circuit and the host to realize FPN compensation of the in-display fingerprint sensing operation and reduce the time consumption of transmitting the FPN data. Those skilled in the art may make modifications and alterations accordingly. For example, the above preload schemes are merely several examples illustrating the possible methods for transmitting the FPN information to the fingerprint image processing circuit from the host, and other possible transmission methods capable of sending the FPN data with less data amount may also be feasible. In another embodiment, in addition to the FPN, the sensing signals may also have an offset under various background interferences such as brightness and temperature. Preferably, the offset may be removed to further increase the effective input range of the ADC and improve the fingerprint sensing performance.

Figure 4:
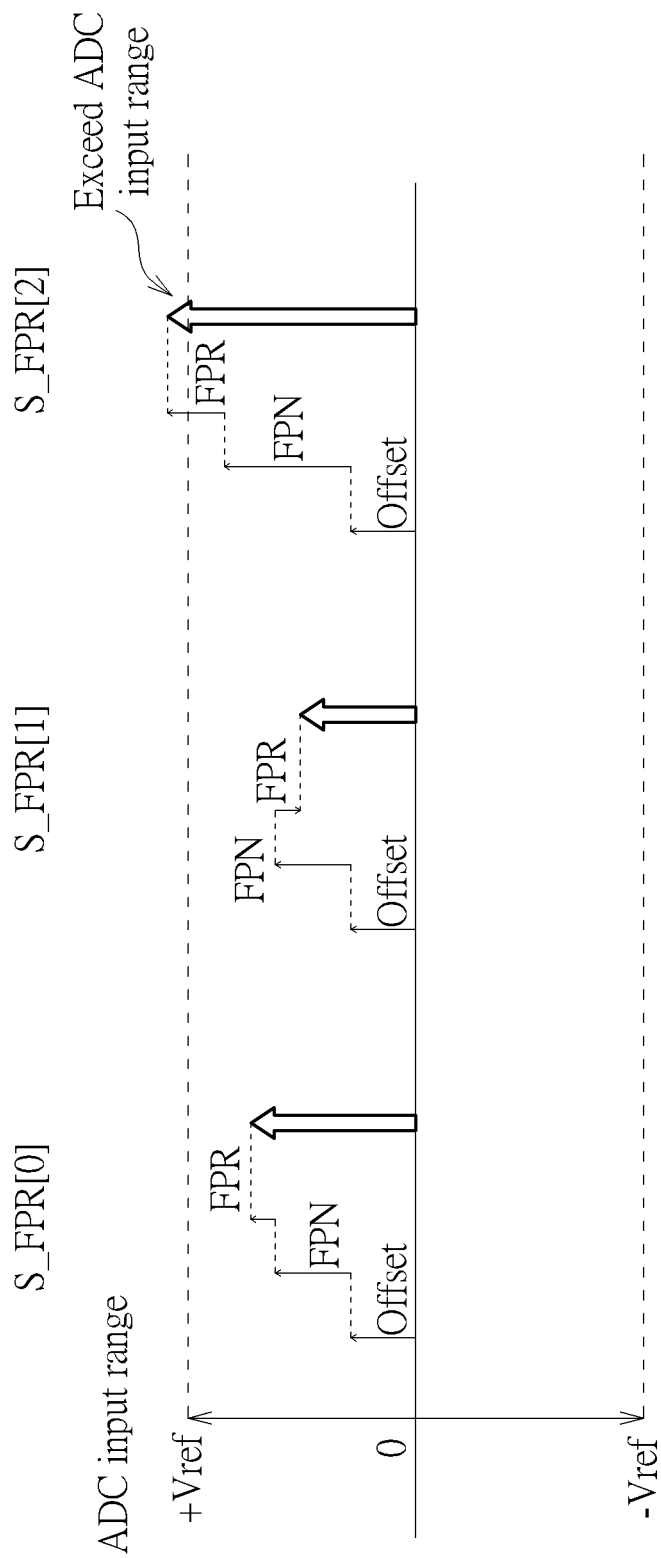
FIG. 4 illustrates fingerprint sensing signals received from the fingerprint sensor under a limited input range of the ADC.

FIG. 4 illustrates fingerprint sensing signals S_FPR[0]-S_FPR[2] received from the fingerprint sensor under a limited input range of the ADC. Each sensing signal is the combination of an offset, an FPN, and a fingerprint signal (denoted by FPR). In this embodiment, the input range of the ADC is between voltages +Vref and −Vref. The offset and the FPN are usually greater than the practical fingerprint signal, and may easily cause the fingerprint sensing signals to exceed the input range of the ADC. As shown in FIG. 4, the fingerprint sensing signal S_FPR[2] is greater than the voltage +Vref and exceeds the ADC's input range.

Figure 5:
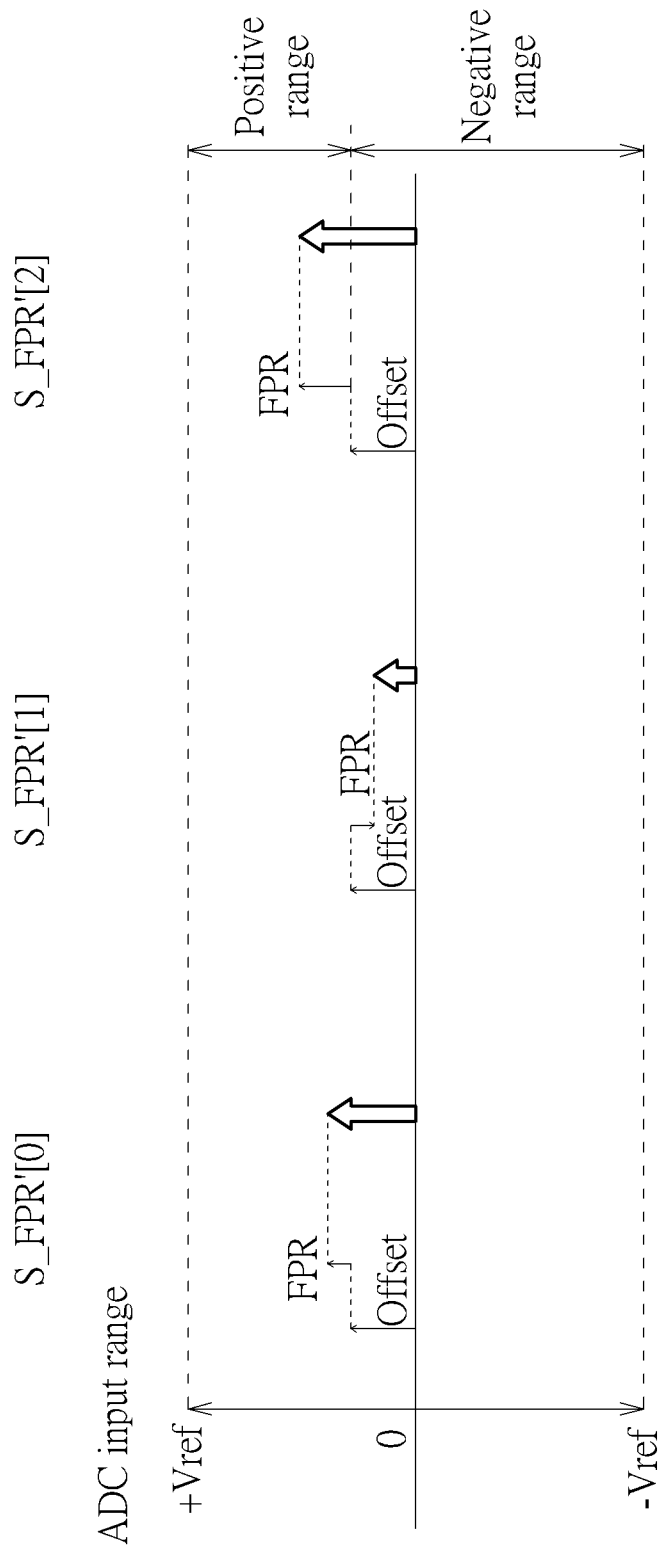
FIG. 5 illustrates that the FPNs are removed from the fingerprint sensing signals.

Based on the method described above, the FPNs may be removed from the fingerprint sensing signals S_FPR[0]-S_FPR[2], to obtain signals S_FPR'[0]-S_FPR'[2], respectively, as shown in FIG. 5. Each of the signals S_FPR'[0]-S_FPR'[2] includes the offset and the fingerprint signal (FPR). With the offset having a positive value, the effective positive range of the ADC may be narrower than the effective negative range of the ADC, such that the fingerprint sensing signals may still easily exceed the ADC's positive range if the fingerprint signal is larger. On the other hand, if the offset has a negative value, the fingerprint sensing signals may probably exceed the ADC's negative range.

Figure 6:
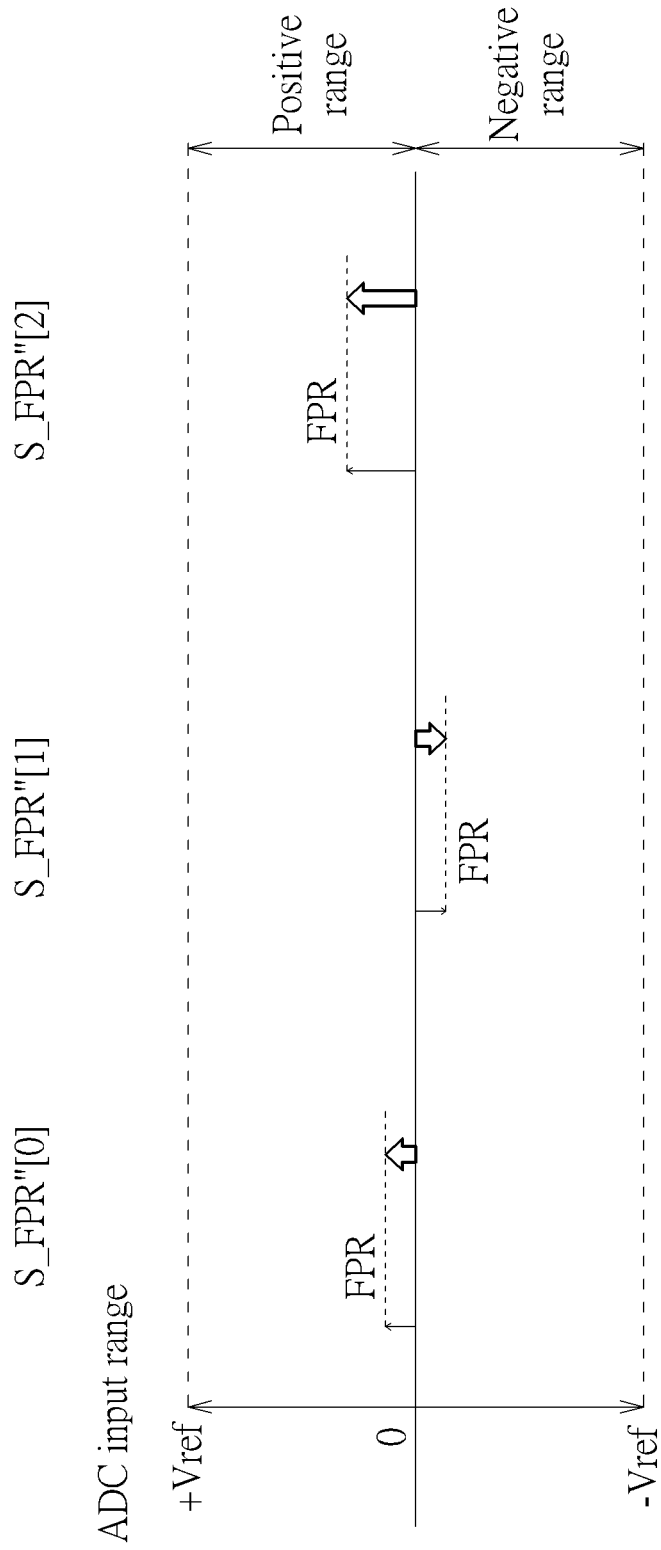
FIG. 6 illustrates that the FPNs and offset are removed from the fingerprint sensing signals.

Therefore, it is preferable to remove the offset from the signals S_FPR'[0]-S_FPR'[2], so as to obtain pure fingerprint signals S_FPR"[0]-S_FPR"[2], as shown in FIG. 6. The fingerprint signals S_FPR"[0]-S_FPR"[2] only include information of the ridge-to-valley difference of the fingerprint, where the FPN and offset are removed. In such a situation, the positive/negative range of the ADC may be identical, and the effective input range of the ADC may be optimized.

The magnitude of the offset may be obtained in a pre-scan operation performed before the fingerprint sensing operation. In an embodiment, the fingerprint image processing circuit 104 may calculate the offset and transmit the offset information to the host 106, and the host 106 may combine the offset with the FPN data value to generate the FPN information to be transmitted to the fingerprint image processing circuit 104.

Figure 7:
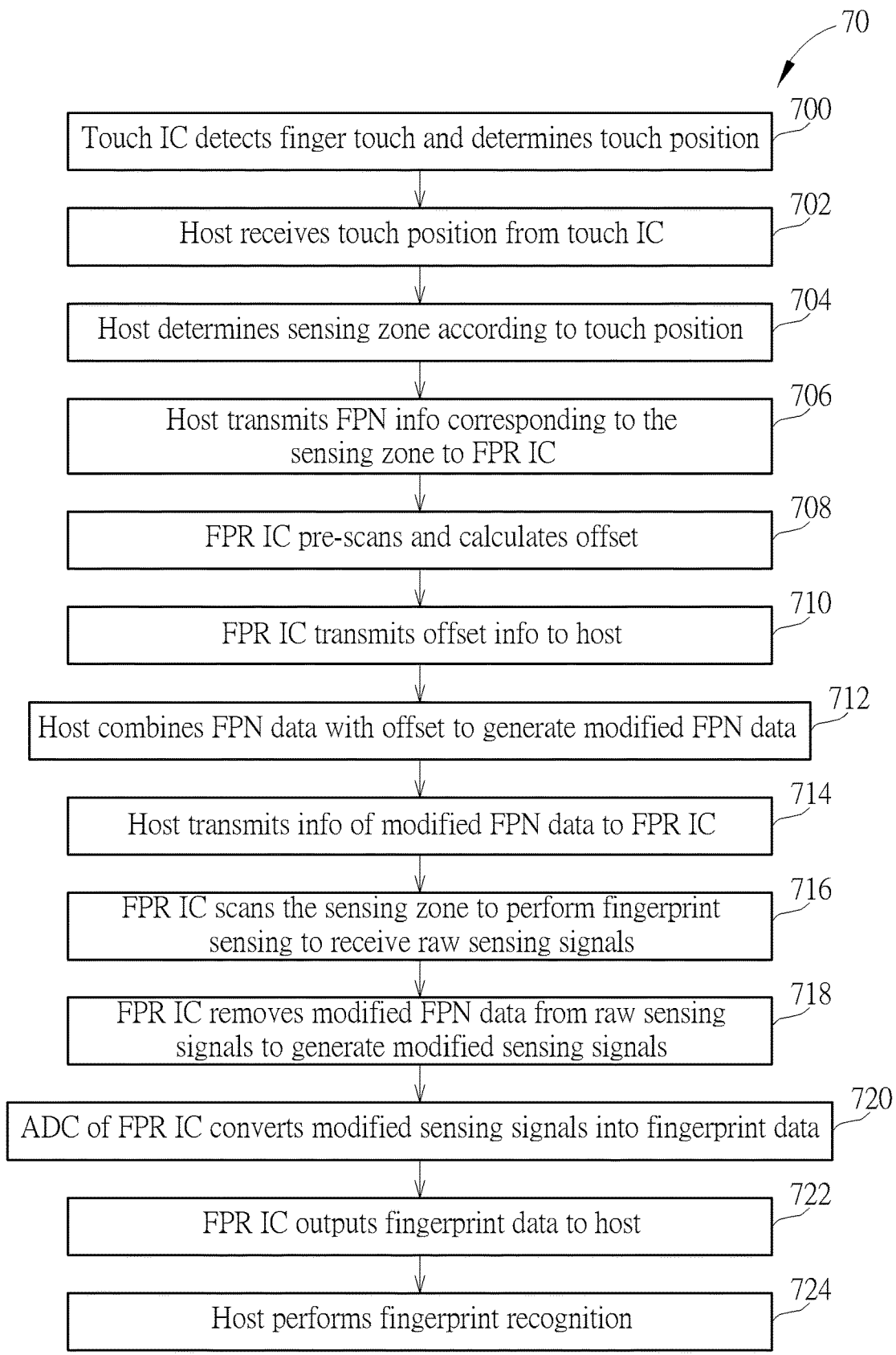
FIG. 7 is a flowchart of a fingerprint sensing process according to an embodiment of the present invention.

FIG. 7 is a flowchart of a fingerprint sensing process 70 according to an embodiment of the present invention. The fingerprint sensing process 70 may be implemented in a fingerprint sensing system, such as the fingerprint sensing system 10 shown in FIG. 1, for handling the fingerprint sensing operations. As shown in FIG. 7, the fingerprint sensing process 70 includes the following steps:

Step 700: The touch control circuit 102 detects a finger touch on the panel and determines a touch position.

Step 702: The host 106 receives the touch position from the touch control circuit 102.

Step 704: The host 106 determines at least one sensing zone of the panel according to the touch position.

Step 706: The host 106 transmits FPN information corresponding to the sensing zone to the fingerprint image processing circuit 104.

Step 708: The fingerprint image processing circuit 104 performs pre-scan and calculates the offset based on the pre-scan result.

Step 710: The fingerprint image processing circuit 104 transmits the offset information to the host 106.

Step 712: The host 106 combines the FPN data with the offset to generate modified FPN data.

Step 714: The host 106 transmits the information of the modified FPN data to the fingerprint image processing circuit 104.

Step 716: The fingerprint image processing circuit 104 scans the sensing zone to perform fingerprint sensing on the finger, to receive a plurality of raw sensing signals.

Step 718: The fingerprint image processing circuit 104 removes the modified FPN data from the raw sensing signals to generate a plurality of modified sensing signals.

Step 720: An ADC of the fingerprint image processing circuit 104 converts the modified sensing signals into a plurality of fingerprint data.

Step 722: The fingerprint image processing circuit 104 outputs the fingerprint data to the host 106.

Step 724: The host 106 performs fingerprint recognition based on the fingerprint data.

According to the fingerprint sensing process 70, the touch control circuit 102 (abbreviated as touch IC in FIG. 7) detects a finger touch on the panel and determines the touch position of the finger, and then sends the touch position information to the host 106. After receiving the touch position information, the host 106 determines or selects at least one sensing zone accordingly. The host 106 then transmits the FPN information of the determined/selected sensing zone to the fingerprint image processing circuit 104 (abbreviated as FPR IC in FIG. 7). Transmission of the FPN information may follow any preload scheme provided in this disclosure. Afterwards, the fingerprint image processing circuit 104 starts the pre-scan operation and calculates the offset. In the pre-scan operation, the fingerprint image processing circuit 104 may pre-scan the entire sensing zone or partial sensing zone to receive pre-scan signals, and then calculate the offset according to the pre-scan signals and the FPNs. More specifically, the fingerprint image processing circuit 104 may subtract the FPNs from the pre-scan signals and then average the signals to obtain the offset. Therefore, the offset is calculated after the FPNs are removed. The calculated offset is then transmitted to the host 106.

Subsequently, the host 106 combines the FPN data corresponding to the sensing zone with the offset to generate a modified FPN, e.g., adding up the offset and the FPN data for each pixel, and then transmits information of the modified FPN to the fingerprint image processing circuit 104. Transmission of the modified FPN information may also follow any preload scheme provided in this disclosure. The fingerprint image processing circuit 104 then performs normal scan on the sensing zone to perform fingerprint sensing on the finger to receive the raw sensing signals, and modifies the raw sensing signals by using the modified FPN information including information of FPN and offset, to generate the modified sensing signals, where both the FPN and offset are removed in the modified sensing signals. Note that the raw sensing signals may be considered as the fingerprint sensing signals S_FPR received from the fingerprint sensor 100 as shown in FIG. 1, and the modified sensing signals are those signals converted by the ADC to generate the fingerprint data D_FPR. The fingerprint image processing circuit 104 then outputs the fingerprint data D_FPR to the host 106 (e.g., through the SPI), allowing the host 106 to perform fingerprint recognition.

Figure 8:
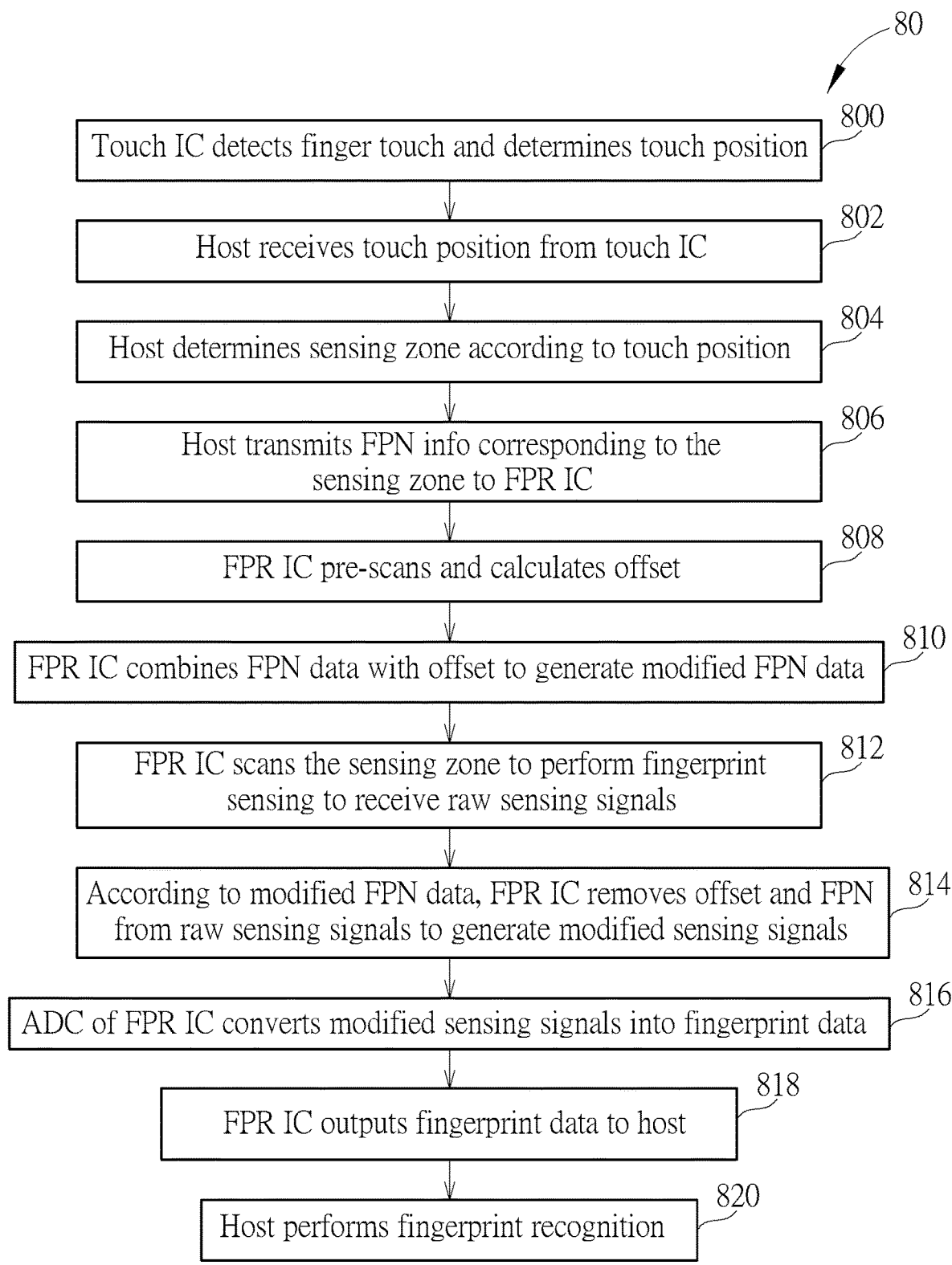
FIG. 8 is a flowchart of another fingerprint sensing process according to an embodiment of the present invention.

In another embodiment, the fingerprint image processing circuit 104 may combine the FPN data with the offset to calculate the modified FPN by itself, thereby reducing the data transmission and simplifying the fingerprint sensing process. FIG. 8 is a flowchart of another fingerprint sensing process 80 according to an embodiment of the present invention. As shown in FIG. 8, the fingerprint sensing process 80 includes the following steps:

Step 800: The touch control circuit 102 detects a finger touch on the panel and determines a touch position.

Step 802: The host 106 receives the touch position from the touch control circuit 102.

Step 804: The host 106 determines at least one sensing zone of the panel according to the touch position.

Step 806: The host 106 transmits FPN information corresponding to the sensing zone to the fingerprint image processing circuit 104.

Step 808: The fingerprint image processing circuit 104 performs pre-scan and calculates the offset based on the pre-scan result.

Step 810: The fingerprint image processing circuit 104 combines the FPN data with the offset to generate modified FPN data.

Step 812: The fingerprint image processing circuit 104 scans the sensing zone to perform fingerprint sensing on the finger, to receive a plurality of raw sensing signals.

Step 814: According to the modified FPN data, the fingerprint image processing circuit 104 removes the offset and the FPN from the raw sensing signals to generate a plurality of modified sensing signals.

Step 816: An ADC of the fingerprint image processing circuit 104 converts the modified sensing signals into a plurality of fingerprint data.

Step 818: The fingerprint image processing circuit 104 outputs the fingerprint data to the host 106.

Step 820: The host 106 performs fingerprint recognition based on the fingerprint data.

The difference between the fingerprint sensing process 80 and the fingerprint sensing process 70 is that, in the fingerprint sensing process 80, the fingerprint image processing circuit 104 combines the FPN data with the offset to generate the modified FPN data by itself. For example, the fingerprint image processing circuit 104 may add up the offset and the FPN data for each pixel to generate the modified FPN data, and use the modified FPN data to generate the modified sensing signals, so that both the FPN and offset are removed in the modified sensing signals. In this manner, the transmission of offset information between the fingerprint image processing circuit 104 and the host 106 may be canceled, which further reduces the time consumption of fingerprint sensing. Other implementations and operations of the fingerprint sensing process 80 are similar to those of the fingerprint sensing process 70, and will be omitted herein.

Figure 9:
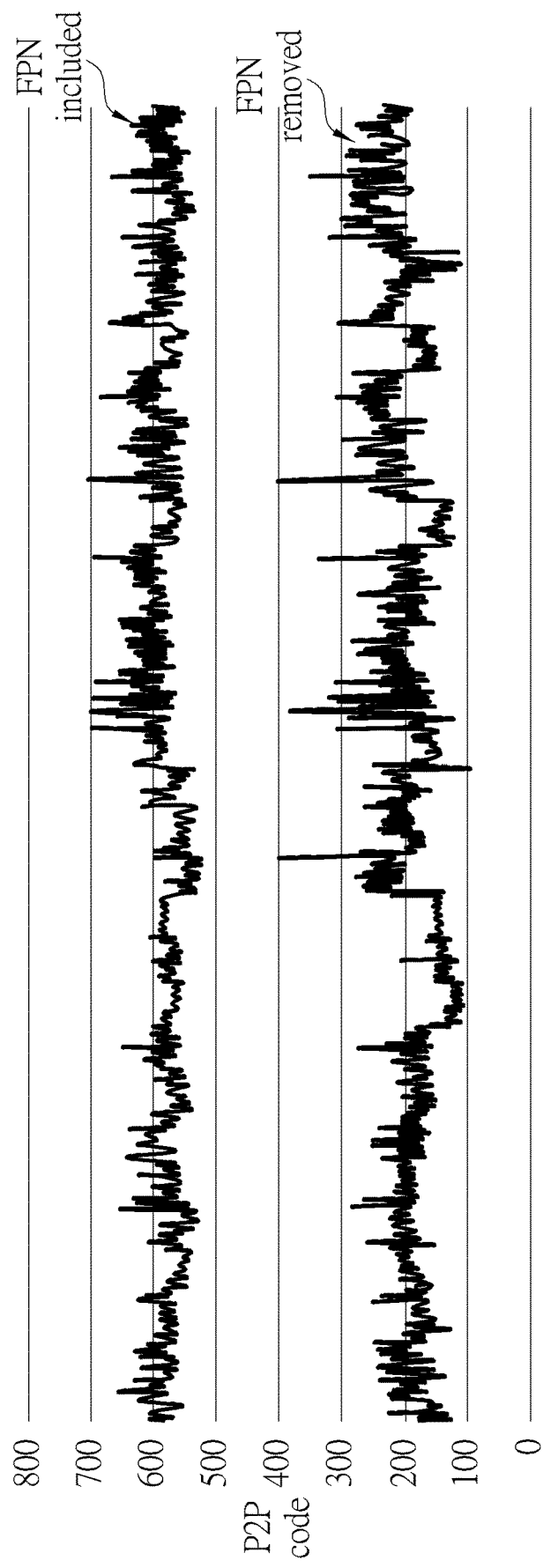
FIG. 9 illustrates the peak-to-peak codes generated in the fingerprint sensing circuit for multiple experimental images with and without removal of the FPNs.

FIG. 9 illustrates the peak-to-peak (P2P) codes generated in the fingerprint sensing circuit for multiple experimental images with and without removal of the FPNs. The peak-to-peak code may be the difference of the maximum and minimum output codes of the ADC included in the fingerprint sensing circuit. If the FPNs are included in the sensing signals received by the ADC, the average peak-to-peak code is approximately 580 over these images; if the FPNs are removed from the sensing signals received by the ADC, the average peak-to-peak code is reduced to approximately 195 over these images. In such a situation, the operations of preloading the FPN information and removing the FPNs from the fingerprint sensing signals may provide a significant reduction of peak-to-peak code, thereby reducing the dynamic range of the signals and decreasing the possibility that a sensing signal exceeds the input range of the ADC.

To sum up, the present invention provides a fingerprint sensing system having a fingerprint image processing circuit and a host, and the related fingerprint sensing operations for reducing or removing the FPNs in the fingerprint sensing signals. In an embodiment, the fingerprint sensing system may perform FPN compensation under the in-display fingerprint sensing operation. Since there are a great number of sensing pixels on the panel, a great amount of corresponding FPN data are stored in the system memory of the host. The host should provide the required FPN data for the fingerprint image processing circuit before fingerprint sensing.

In an embodiment, the host may receive the information of touch position and determine that the fingerprint sensing should be performed on at least one sensing zone according to the touch position. The host then transmits the FPN information corresponding to the sensing zone to the fingerprint image processing circuit; hence, the fingerprint image processing circuit is not necessarily deployed with a large memory for storing the FPN data of the entire panel. The fingerprint image processing circuit then performs fingerprint sensing and removes the FPNs according to the FPN information received from the host. The FPNs may be removed in the AFE circuit of the fingerprint image processing circuit; hence, the dynamic range of the signals received by the ADC may be decreased, which improves the performance of fingerprint sensing. Further, in order to save the transmission time of the FPN information, the present invention provides several preload schemes for reducing the data amount transmitted to the fingerprint image processing circuit, which accelerates the fingerprint sensing operations and improves the user experience of fingerprint recognition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit for controlling a panel, the image processing circuit being configured to:
   receive information of a fixed pattern noise (FPN) corresponding to a first sensing zone of the panel, wherein the first sensing zone is determined according to a touch position of a finger, wherein the image processing circuit receives the information of the FPN of a plurality of first sensing pixels in the first sensing zone without receiving information of the FPN of a plurality of second sensing pixels outside the first sensing zone;
   scan the first sensing zone to perform fingerprint sensing on the finger, to receive a plurality of raw sensing signals;
   remove the FPN from the plurality of raw sensing signals to generate a plurality of modified sensing signals; and
   output a plurality of fingerprint data to a host for fingerprint recognition, wherein the plurality of fingerprint data are converted from the plurality of modified sensing signals.

2. The image processing circuit of claim 1, wherein the panel comprises a plurality of sensing zones, and the first sensing zone is selected from the plurality of sensing zones according to the touch position of the finger.

3. The image processing circuit of claim 1, wherein the first sensing zone comprises a plurality of sensing pixels centering on a center of the touch position.

4. The image processing circuit of claim 1, further configured to:
   pre-scan the first sensing zone to receive a plurality of pre-scan signals;
   calculate an offset according to the plurality of pre-scan signals; and
   remove the offset in addition to the FPN from the plurality of raw sensing signals to generate the plurality of modified sensing signals.

5. The image processing circuit of claim 1, wherein the first sensing zone comprises a plurality of FPN data, and the information of the FPN received by the image processing circuit contains only a first part of the plurality of FPN data corresponding to sensing pixels having a specific interval.

6. The image processing circuit of claim 5, further configured to generate a second part of the plurality of FPN data according to the first part of the plurality of FPN data through interpolation.

7. The image processing circuit of claim 1, wherein the first sensing zone comprises a plurality of FPN data, and each of the plurality of FPN data is encoded to have a fixed term and a variable term as the information of the FPN to be received by the image processing circuit;

wherein the fixed term of the plurality of FPN data has the same value, and the variable term of an FPN data among the plurality of FPN data is calculated according to the FPN data minus the fixed term.

8. The image processing circuit of claim 7, wherein a resolution of the variable term is lower than a resolution of the plurality of FPN data.

9. The image processing circuit of claim 1, wherein the first sensing zone comprises a plurality of FPN data, and the information of the FPN comprises a plurality of differential values of the plurality of FPN data.

\* \* \* \* \*